United States Patent [19]

Hirata et al.

[11] Patent Number: 5,127,463
[45] Date of Patent: Jul. 7, 1992

[54] REFRACTORY BRICK SEGMENT FOR A HEAT REGENERATOR

[75] Inventors: Kumio Hirata, Kozaki; Yasuo Saito, Narita, both of Japan

[73] Assignee: Toshiba Monofrax Co., Ltd., Japan

[21] Appl. No.: 737,271

[22] Filed: Jul. 29, 1991

[30] Foreign Application Priority Data

Sep. 13, 1990 [JP] Japan .................................. 2-241241

[51] Int. Cl.⁵ .............................................. F28D 17/02
[52] U.S. Cl. ...................................... 165/9.1; 165/9.3
[58] Field of Search ................... 165/9.1, 9.2, 9.3, 9.4

[56] References Cited

U.S. PATENT DOCUMENTS

| 4,436,144 | 3/1984 | Horak | 165/9.1 |
| 4,540,039 | 9/1985 | Karl | 165/9.4 |
| 4,651,810 | 3/1987 | Triessnig | 165/9.2 |
| 4,874,034 | 12/1989 | Hirata et al. | 165/9.1 |
| 4,974,666 | 12/1990 | Hirata et al. | 165/9.1 |

FOREIGN PATENT DOCUMENTS

| 0093472 | 1/1983 | European Pat. Off. |  |
| 494577 | 3/1930 | Fed. Rep. of Germany | 165/9.3 |
| 1135607 | 8/1962 | Fed. Rep. of Germany | 165/9.3 |

Primary Examiner—Albert W. Davis, Jr.
Attorney, Agent, or Firm—Ronald P. Kananen

[57] ABSTRACT

A refractory brick segment for use in a heat regenerator is made of an electrocast refractory material in the shape of a tube. The brick segment has a wall thickness of from 35 mm to 75 mm and a substantially rectangular cross-section. All of an inner side wall, an outer side wall and a corner wall have concave portions so as to have a total volume which is from 0.4 times or more to 0.85 times or less as large as that of a corresponding brick segment having no concave portions and a surface area per volume unit which is 1.5 times or more as large as that of a corresponding brick segment having no concave portions.

9 Claims, 4 Drawing Sheets

REFRACTORY BRICK SEGMENT FOR A HEAT REGENERATOR

BACKGROUND OF THE INVENTION

This invention relates to a refractory brick segment for use in a heat regenerator or exchanger adapted to be used in a glass fusion industry or an iron and steel industry. In particular, this invention relates to a refractory brick segment having plural grooves and made of an electroformed or electrocast refractory material.

In a conventional glass fusion furnace, many refractory brick segments are assembled in a heat regenerator. Hot exhaust gas is used to heat the refractory brick segments in such a manner that secondary cold combustion air is preheated by the heated brick segments. For example, the hot exhaust gas coming through a blow-off hole of a fusion chamber is usually introduced into an upper end portion of a heat regenerator and then flows out of its lower end portion. While the hot exhaust gas flows downwardly through passages defined by the brick segments, they are heated so as to accumulate heat. Thus, the brick segments gradually increase in temperature. After that, the exhaust gas flow stops by closing a valve, and then secondary air at a room temperature is introduced into a lower portion of the heat regenerator. While the secondary air flows upwardly through the passages of the heat regenerator, the air is heated by the brick segments maintained at a high temperature. Such a cycle of two opposite flows is repeated by switching a valve so that the exhaust gas and the air flow alternately through the heat regenerator.

In order to improve the heat regenerating efficiency of such brick segments, various shapes of them have been proposed so that the heat transmission rate between the refractory brick segment and the hot exhaust gas can be improved.

For example, FIG. 4 shows a conventional refractory brick assembly as disclosed in U.S. Pat. No. 4,436,144 which comprises plural refractory brick segments 1 each made of a refractory material. Each refractory brick segment 1 has a uniform thickness over a full length thereof. The refractory brick segments are vertically piled in such a manner that a plurality of flow passages 2 are formed so as to extend in a vertical direction. Four corners 1a of each refractory brick segment 1 are so cut that a cross section thereof is octagonal. The corners 1a of horizontally adjacent refractory brick segments 1 contact each other while the upper ends 1b contact the corresponding lower ends 1c.

As the thickness of each brick segment is thin in comparison with the conventional post type brick segments, a specific surface area or surface area per unit volume of a regenerator is relatively large. Thus, the thin brick segments have a large heat exchange area for the hot exhaust gas and the secondary air to be heated which flow along the inner and outer walls of the piled brick segments.

FIG. 5 shows another conventional refractory brick assembly for a heat regenerator as disclosed in U.S. Pat. No. 4,974,666 and U.S. Pat. No. 4,874,034 in which each brick segment has a further enlarged specific surface area.

The refractory brick assembly of FIG. 5 includes two types of tube type brick segments 5, 6 each having a plurality of convex and concave strips 5a, 6a in series which extend in parallel to each other on the inner and outer walls of each brick segment. These convex and concave strips 5a, 6a enlarge the specific surface area of the brick segments and produce turbulent flows so as to remarkably increase the heat transmission or exchange rate.

Each brick segment has four corner portions 7 each engaging the corresponding corner portion 7 of a horizontally adjacent segment in such a manner that the convex strips are in contact with the concave strips whereby a large number of brick segments can be piled in a stable condition.

In order to improve corrosion resistance against alkaline dust, electric-fused cast refractory materials have been proposed as materials for refractory brick segments for use in heat regenerators, in place of fired refractory materials. Such electric-fused cast refractory materials are manufactured by electric-fusing desired starting materials and then casting the same by a die means so as to have good thermal stability and dense structure. In particular, the electric-fused cast refractory materials have very excellent corrosion resistance against fused glass or alkaline. The thermal conductivity of the electric-fused cast refractory materials is better than that of the fired refractory materials. Examples of the electric-fused cast refractory materials are alumina-silica-zirconia electric-fused cast refractory materials and zirconia electric-fused cast refractory materials.

The electric-fused cast refractory materials can be easily formed in a complicated shape as they are cast by a mold. However, they are very expensive in comparison with the fired refractory materials.

In order to reduce the production cost, it is effective that the conventional fired refractory materials are used at low-temperature portions and electro-cast refractory materials are used at high-temperature portions. Usually the low-temperature portions of the heat regenerator are positioned in its lower place. If the post-type or tube-type refractory having a thickness of 65 mm or 75 mm is used in its lower place as a heat regenerator brick segment, a high-temperature brick segment having the same thickness as that of a low-temperature brick segment is used in an upper place of the regenerator so as to define the flow passages having the same size as that of the flow passages of the low-temperature brick segments. If a conventional fired refractory brick segment of a tube shape having a rectangular cross-section and a thickness of 40 mm is used in the low-temperature place, an electrocast refractory brick segment having the same thickness as that of the fired refractory brick segment is preferably used in the high-temperature place.

SUMMARY OF THE INVENTION

The object of the present invention is to provide a refractory brick segment for use in a heat regenerator in which the flow passages defined by them can have improved heat transmission efficiency between the gas flows and the refractory brick segments by researching proper selected sizes and shapes of brick segments for use in a heat regenerator which have complicated inner and outer wall surfaces so as to utilize the above-stated properties of the electrocast refractory brick segments.

According to the present invention, a refractory brick segment for use in a heat regenerator which is made of an electrocast refractory material, comprising a wall thickness of from 35 mm to 75 mm, a substantially rectangular cross-section, an inner side wall having concave portions, an outer side wall having concave portions and a corner wall having concave portions, the total volume of the brick segment ranging from 0.4 times or more to 0.85 times or less as large as that of a corresponding brick segment having no concave portions, and a surface area per volume unit being 1.5 times or more as large as that of a corresponding brick segment having no concave portions.

In the refractory brick segment, the concave portions are circular or angular in cross section. For example, the concave portions are formed by forming a plurality of grooves in each flat surface of the walls. The shape of vertical section of the grooves is trapezoidal. It is preferable that the concave portions are formed in the shape of bellows.

In order to obtain the best results, a vertical section of the inner wall is the same in shape as that of the outer wall and the brick segment has substantially the same thickness.

DESCRIPTION OF THE PREFERRED EMBODIMENTS

Figure 1:
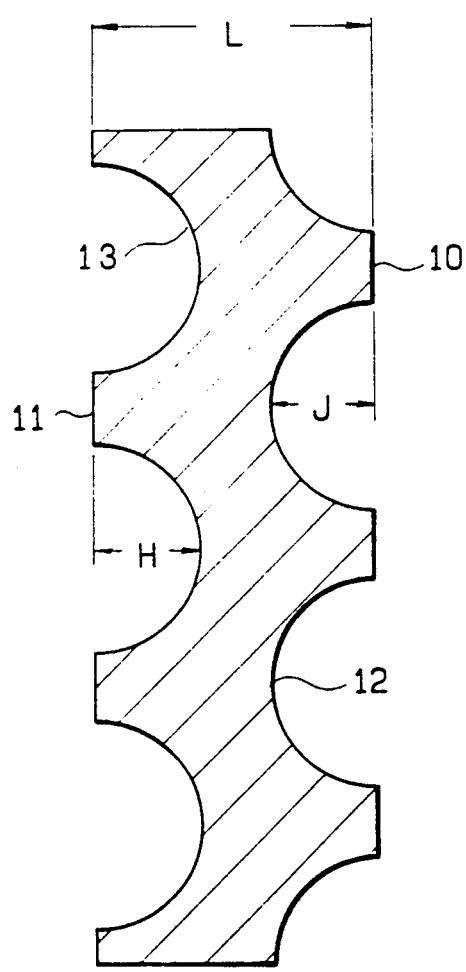
FIG. 1 is a vertical sectional view showing a portion of a refractory brick segment for use in a heat regenerator according to a preferred embodiment of the present invention.
Figure 2:
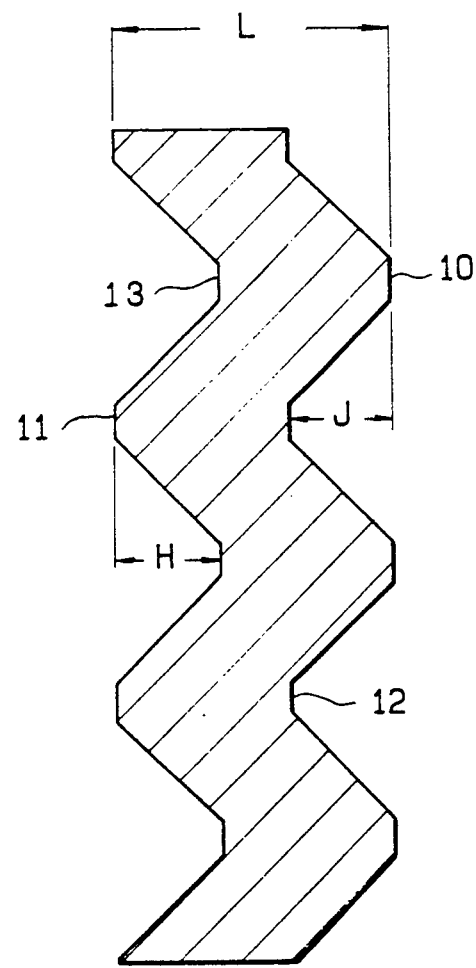
FIG. 2 is a vertical sectional view showing a portion of a brick segment for use in a heat regenerator according to a further embodiment of the present invention.

As shown in FIGS. 1 and 2, a rectangular tube type brick segment for use in a heat regenerator has an outer wall 10 and an inner wall 11. A plurality of grooves 12, 13 are formed in the surface of the outer wall 10 and the inner wall 11. The shape of the grooves 12, 13 may be circular or angular in cross section.

The grooves 12, 13 constitute concave portions in the flat surface of the outer wall 10 and the inner wall 11. In other words, the remaining flat portions in the outer wall 10 and the inner wall 11 constitute convex portions.

According to the present invention, the shape of such convex and concave portions is designed so as to increase the heat exchange efficiency particularly by taking into consideration the relationships between the thickness of the walls and the size of the grooves. For example, the brick segment has a substantially rectangular or square cross-section and plural concave portions by forming the grooves 12, 13 in the outer wall 10, the inner wall 11 and the corner walls, as a brick segment of a tube shape for use in a heat regenerator which is made of an electrocast refractory material. As a result of our research, in order to obtain the best results of the heat exchange efficiency, it is preferable that the wall thickness L ranges from 35 mm or more to 75 mm or less. It is also preferable that the total volume of the brick segment is from 0.4 times or more to 0.85 times or less as large as that of the brick segment having no concave portions 12. It is further preferable that the ratio of the surface area to the volume of the brick segment having the concave portions 12 is 1.5 times or more as large as that of the brick segment having no concave portions 12.

A preferable example of the present invention will be explained in detail.

Figure 3A:
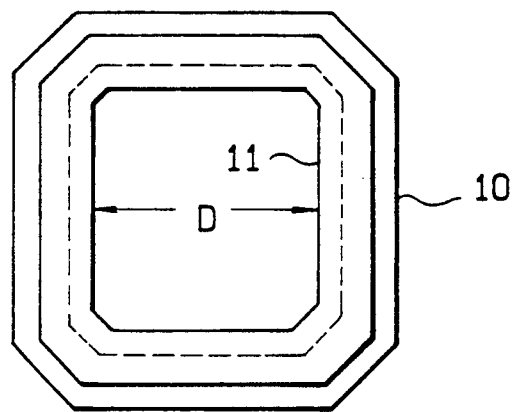
FIG. 3A is a top view showing a brick segment according to an embodiment of the present invention.
Figure 3B:
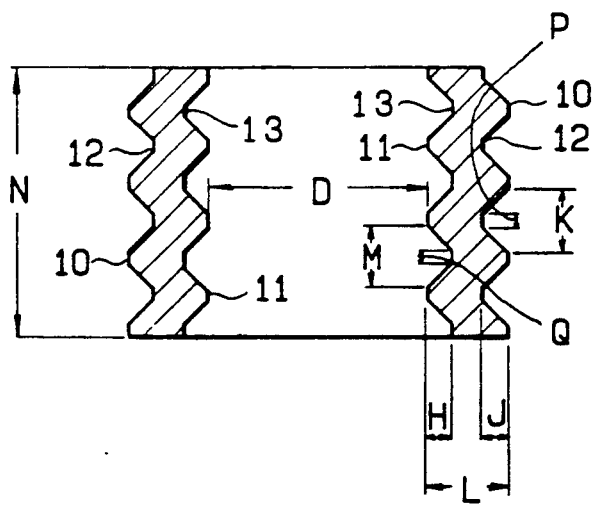
FIG. 3B is a vertical sectional view showing the brick segment shown in FIG. 3A.
Figure 4:
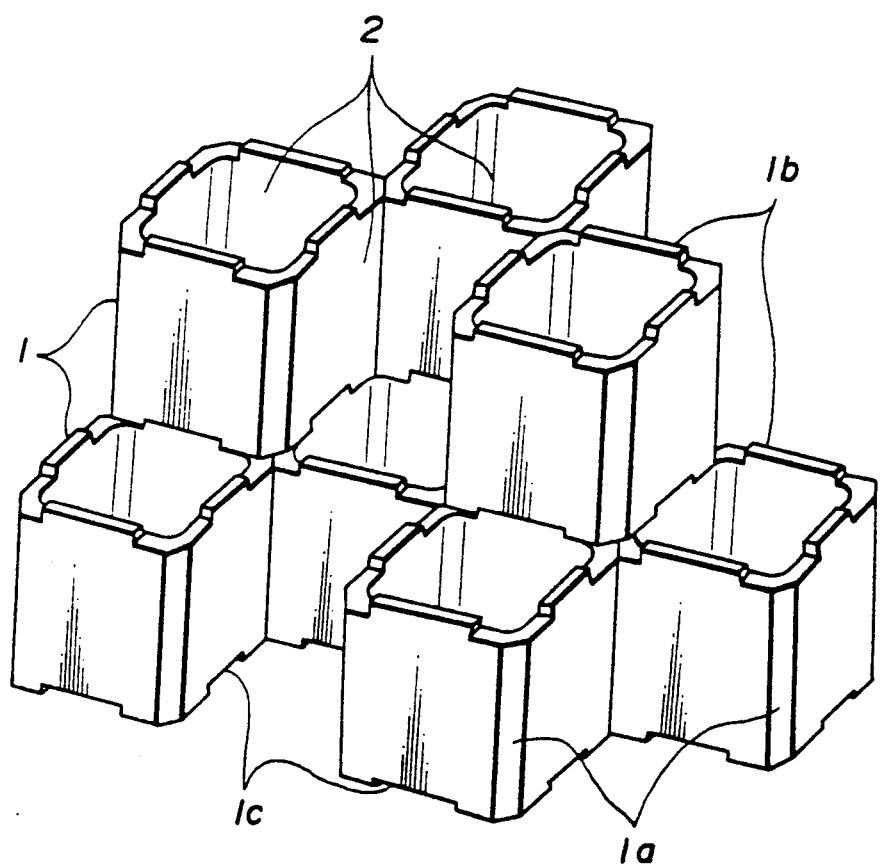
FIG. 4 is a perspective view showing a conventional brick segment assembly for a heat regenerator.
Figure 5:
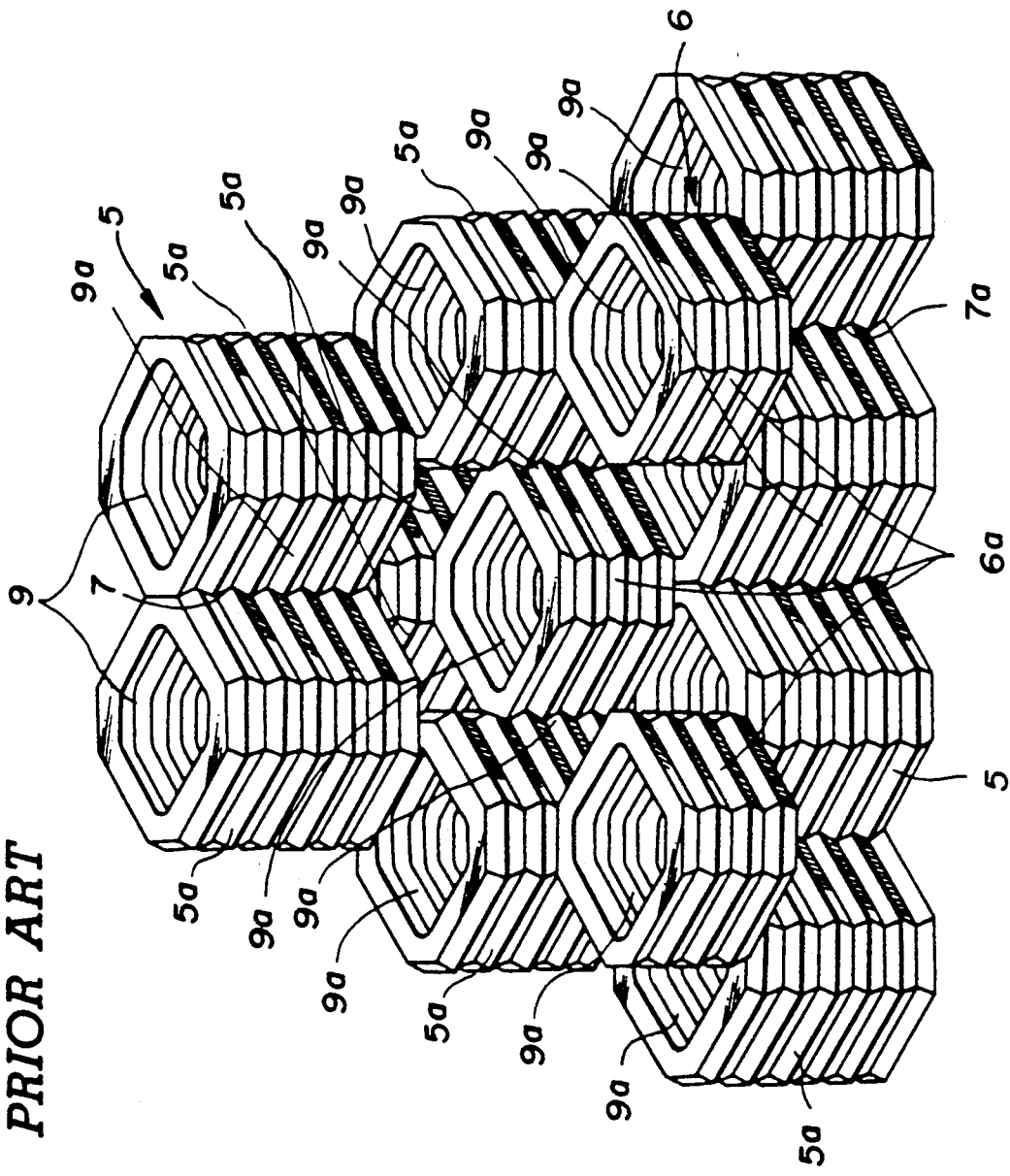
FIG. 5 is a perspective view showing another conventional brick segment assembly for a heat regenerator.

FIG. 3A is a top view showing a brick segment made of an electrocast refractory material for use in a heat regenerator according to an example of the present invention. FIG. 3B is a vertical sectional view showing the brick segment shown in FIG. 3A.

D designates a size of the inner flow passages. L designates a wall thickness. K designates a width of the grooves 12 formed in the outer wall 10. J designates a depth of the grooves. M designates a width of the grooves 13 formed in the surface of the inner wall. H designates a depth of the grooves 7. Usually, K and M have the same size. J and H have the same size. N designates the height of the brick segment.

The cross section of the grooves 12 is trapezoidal in which the base has a length K, and the top leg has a length P, and the height is J. The pitch of the grooves 12 is K+P. The shape in cross section of the grooves 13 is also trapezoidal in which the length of the base is M, and the top leg has a length of Q, and the height is H. The pitch of the groove 13 is M+Q.

An example of these sizes is as follows:

D=140 mm, K=45 mm, M=45 mm, J=20 mm, H=20 mm, N=180 mm, L=65 mm, P=5 mm, Q=5 mm.

In this brick segment, by forming the grooves 12 in the outer wall 10 and the inner wall 11, the surface area is increased. It is increased 1.36 times. On the other hand, by forming the grooves 12, the volume of the brick segment is decreased 0.68 times as large as that of the original brick segment having no grooves 12. As a result, the surface area per unit volume of the brick segment having the grooves 12 is 2.0 times as large as that of the brick segment having no grooves.

In case the concave portions are formed in the walls of the refractory brick segment, the heat efficiency of the heat regenerator increases. If the remaining volume is less than 0.4 times as large as that of the original brick segment, the regenerating heat capacity decreases. Also, the corrosion resistance against alkaline dust decreases.

If the remaining volume is larger than 0.85 times as large as that of the original brick segment, the total volume of the intermediate portions in the brick segment between the remaining flat portions becomes too much. The intermediate portions of the brick segment do not contribute to the heat regeneration effectively at least in comparison with the other portions having the concave portions. Therefore, if the intermediate portions have a large volume, the heat regeneration efficiency is not increased.

Another example of the brick segment according to the present invention is explained as follows:

D=140 mm, K=31 mm, M=31 mm, J=13 mm, H=13 mm, N=239 mm, L=40 mm, P=5 mm, Q=5 mm.

The brick segment of this example has an increased surface area which is 1.30 times as large as that of the brick segment having no grooves, by forming the grooves 12 in the inner wall and the outer wall. By providing the grooves 12, the volume of the brick segment decreases so as to be 0.68 times as large as that of the brick segment having no grooves. The surface area per unit volume of the brick segment having the grooves 12 is 1.9 times as large as that of the brick segment having any grooves 12.

The shapes of the concave portions as above-stated are not limited to the illustrated embodiments only in which bellows-shaped parallel convex and concave strips are formed in the vertical walls. It is possible that the concave portions in the outer wall are different in shape from the concave portions in the inner wall.

In case the brick segment is formed in the shape of bellows such that the vertical section of the inner wall is the same in shape as that of the outer wall and the brick segment has substantially the same thickness over its full length, as shown in FIG. 2, the thermal shock resistance is excellent. It is particularly important because the electrocast refractory material has relatively small thermal shock resistance in comparison with the fired refractory material although it is not essential to the present invention.

Each top of the convex portions and each bottom of the concave portions can be formed in any desired shape. For example, the top and the bottom can be circular or flat in cross section.

By providing the grooves 12 in the inner and outer walls, the surface area can be increased. As a result, the heat transmission area for the gas flow is increased. In addition, the gas flow can become turbulent so that the heat transmission efficiency between the brick segments and the gas flows can be increased.

The electrocast refractory brick segments according to the present invention can be used in combination with the prior art brick segments. For example, the prior art heat regenerator includes a plurality of rectangular cross section brick segments having a thickness of 65 mm in which some brick segments are broken in an upper portion of the regenerator, only the broken brick segments in the upper portion of the heat regenerator can be removed and then the new brick segments according to the present invention can be used in place of them. In such a case, the brick segments according to the present invention can be easily piled on the prior art brick segments which were piled in the heat regenerator. The brick segments according to the present invention may have the same wall thickness and the same gas flow passage size as those of the prior art brick segments.

A desired number of brick segments according to the present invention can be mixed or combined with the prior art brick segments having the different shapes. For example, even if a chimney-shaped or cross-shaped brick segments are piled in the prior art heat regenerator and have a thickness of 40 mm, the brick segments according to the present invention having a wall thickness of 40 mm can be used.

The difference in temperature between the upper and lower portions of a heat regenerator is usually very large. Therefore, it is preferable that most suitable materials to the respective portions of the heat regenerator are employed in order to achieve the economic operation. Therefore, it is preferable that cheap fired refractory brick segments are used in a low-temperature portion of a heat regenerator while expensive electrocast refractory brick segments are used in a high-temperature portion.

It is preferable that a conventional fired brick segments are a hexahedron post type standard brick which have usually a thickness of 65 mm. If the fired refractory brick segments are complicated in shape, their production costs are apt to be expensive. Therefore, in such cases, the standard brick segments should be simple in shape so as to be cheap.

Even if such prior art standard brick segments are used in the lower portion of the heat regenerator where the operating temperatures are relatively low, the brick segments according to the present invention can be combined with such cheap fired refractory brick segments. In such a case, the flow passages can be defined by the prior art brick segments and the brick segments of the present invention in combination such that the gas can flow smoothly. The heat transmission efficiency is large, and the regenerating efficiency can be remarkably increased because it has a large specific surface area.

How to pile the brick segments according to the present invention is disclosed in U.S. Pat. No. 356,114 which is hereby incorporated by reference.

What is claimed is:

1. A refractory brick segment for use in a heat regenerator which is made of an electrocast refractory material in the shape of a tube, comprising a wall thickness of from 35 mm to 75 mm, a substantially rectangular cross-section an inner side wall having concave portions, transverse to the axis of said tube, an outer side wall having concave portions the concave portions of said inner and outer side walls being arranged so as to have a serpentine configurations in section, and a corner wall having concave portions, a total volume of the brick segment ranging from 0.4 times or more to 0.85 times or less as large as that of a corresponding brick segment having no concave portions, and a surface area per volume unit being 1.5 times or more as large as that of a corresponding brick segment having no concave portions.

2. The refractory brick segment of claim 1, wherein the concave portions are circular in cross section.

3. The refractory brick segment of claim 1, wherein the concave portions are angular in cross section.

4. The refractory brick segment of claim 1, wherein the concave portions are formed by forming a plurality of grooves in each flat surface of the walls.

5. The refractory brick segment of claim 1, wherein the grooves are trapezoidal in cross section.

6. The refractory brick segment of claim 1, wherein the the brick segment is formed in the shape of bellows.

7. The refractory brick segment of claim 6, wherein the cross section of the brick segment is square.

8. The refractory brick segment of claim 6, wherein a vertical section of the inner wall is the same in shape as that of the outer wall and the brick segment has substantially the same thickness.

9. The refractory brick segment of claim 1, wherein the cross section of the brick segment is square.

* * * * *